(12) United States Patent
Mudulodu et al.

(10) Patent No.: US 8,160,188 B2
(45) Date of Patent: Apr. 17, 2012

(54) METHOD AND SYSTEM FOR COMMUNICATION IN A WIRELESS ORTHOGONAL FREQUENCY DIVISION MULTIPLEXING (OFDM) COMMUNICATION SYSTEM

(75) Inventors: Sriram Mudulodu, Santa Clara, CA (US); Louay Jalloul, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 609 days.

(21) Appl. No.: 12/317,162

(22) Filed: Dec. 18, 2008

(65) Prior Publication Data

US 2010/0158139 A1 Jun. 24, 2010

(51) Int. Cl.
*H04B 7/10* (2006.01)
(52) U.S. Cl. ....................................................... 375/347
(58) Field of Classification Search ............... 375/259, 375/260, 267, 295, 299, 316, 340, 346, 347, 375/348; 370/230, 208, 210; 455/91, 101, 455/24, 68, 69, 39, 63.1, 65, 73, 550.1, 561, 455/130, 132, 133, 134, 135, 137
See application file for complete search history.

(56) References Cited

U.S. PATENT DOCUMENTS

| | | | |
|---|---|---|---|
| 2005/0233709 A1* | 10/2005 | Gardner et al. | 455/101 |
| 2006/0193245 A1* | 8/2006 | Aghvami et al. | 370/208 |
| 2009/0046805 A1* | 2/2009 | Kim et al. | 375/295 |
| 2009/0080543 A1* | 3/2009 | Azizi et al. | 375/260 |

OTHER PUBLICATIONS

Kim et al. , "Differential STBC MIMO-OFDM System with Cyclic Delay Diversity for Mobile Multimedia Communication Systems", 9th International Conference on Advanced Communication Technology, Feb. 2007, pp. 1660-1664.*

* cited by examiner

*Primary Examiner* — Vineeta Panwalkar
(74) *Attorney, Agent, or Firm* — Sterne, Kessler, Goldstein & Fox P.L.L.C.

(57) ABSTRACT

Method and system for wireless communication in an Orthogonal Frequency Division Multiplexing (OFDM) communication system is disclosed. The method involves receiving a plurality of receive-signals over a first set of antennas. Further, one or more of the plurality of receive-signals are cyclically delayed to generate one or more cyclically delayed receive-signal. Subsequently, one or more of the plurality of receive-signals are combined with one or more of the cyclically delayed receive-signals. In other words, the method involves performing receive Cyclic Delay Diversity (CDD).

13 Claims, 13 Drawing Sheets

METHOD AND SYSTEM FOR COMMUNICATION IN A WIRELESS ORTHOGONAL FREQUENCY DIVISION MULTIPLEXING (OFDM) COMMUNICATION SYSTEM

FIELD OF THE INVENTION

The present invention generally relates to wireless multi-carrier communication systems, and more specifically, to methods and system for communication in a wireless Orthogonal Frequency Division Multiplexing (OFDM) system.

BACKGROUND OF THE INVENTION

Modern wireless communication systems employ a number of diversity techniques in order to improve quality and reliability of a wireless communication link. Examples of diversity techniques that are widely used include, but are not limited to, frequency diversity, time diversity and spatial diversity. Each of these techniques transmits data on a plurality of independent channels having different characteristics. Since simultaneous loss of data in each of the plurality of independent channels is less probable, the use of diversity techniques improves error performance of a communication system in spite of several adverse channel effects such as, but not limited to, fading, interference and noise. Consequently, diversity techniques have been extensively used to provide reliable communication across channels with unfavorable conditions.

One of the widely used diversity technique is spatial diversity, also known as antenna diversity. In this diversity technique, multiple spatially separated antennas are used for transmission or reception of data. For example, data may be transmitted by a plurality of spatially separated transmit-antennas towards a receive-antenna. Each path of transmission between a transmit antenna and the receive antenna forms an independent channel carrying the same data. Thus, the use of antenna diversity introduces redundant transmissions of the data. As a result, the error performance of the communication system is greatly improved.

The improved error performance offered by antenna diversity has been successfully exploited in multicarrier communication systems such as OFDM systems. OFDM systems use antenna diversity for both transmission and reception. The most common form of antenna diversity used for transmission at a Base Station (BS) in an OFDM system is called Transmit Cyclic-Delay-Diversity (CDD). Transmit-CDD is a diversity technique which artificially increases frequency selectivity of a channel by transmitting cyclically delayed versions of the data in addition to the transmission of un-delayed data. Each of the cyclically delayed versions of the data appears as a multipath to a receive-antenna. Effectively, the receive antenna perceives the multiple cyclically delayed versions of data as multipath transmissions from a single transmit-antenna. Therefore, the use of transmit-CDD improves communication while ensuring that the use of multiple transmit-antennas is transparent to the receive-antenna.

In addition to transmit-CDD, a BS also uses antenna diversity technique for reception. The most commonly used antenna diversity technique for reception is Maximum Ratio Combiner (MRC) technique. In this technique, signals derived from multiple receive-antennas at the BS are combined in order to maximize the signal-to-noise ratio. In effect, receive-signal from a receive-antenna at the BS is weighted proportionally by the SNR corresponding to that receive antenna. As a result, reception is improved by enhancing signals from antennas having better SNR.

Usually, the same set of antennas is used at a BS for both transmission and reception. However, the use of different antenna diversity techniques at the BS for transmission and reception results in an asymmetrical channel relationship between the BS and a Subscriber Station (SS).

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
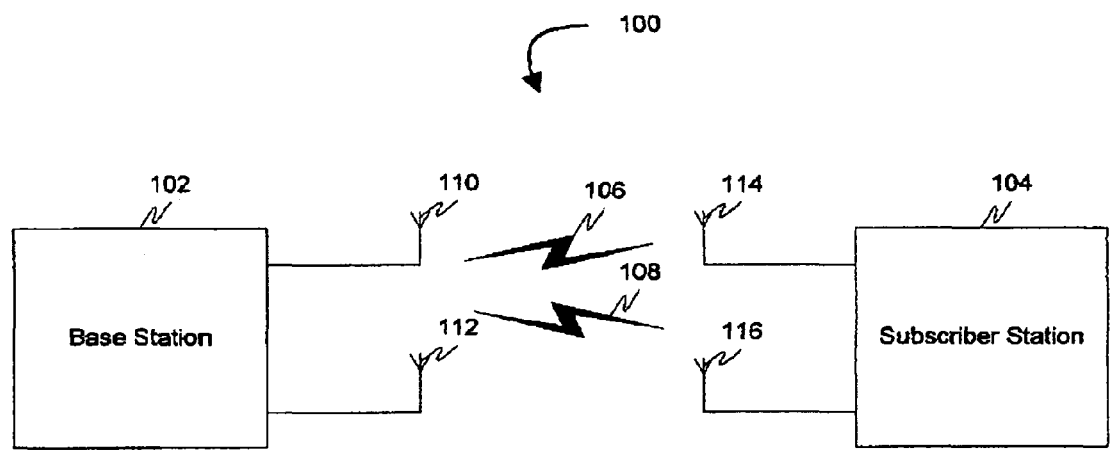
FIG. 1 illustrates a wireless communication system in which various embodiments of the present invention may function.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail the embodiments that are in accordance with the present invention, it should be observed that the embodiments reside primarily in combinations of method steps and system components related to method and system for communication in a wireless Orthogonal Frequency Division Multiplexing (OFDM) system. Accordingly, the system components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or system that comprises the element.

It will be appreciated that embodiments of the present invention described herein may be comprised of one or more conventional transaction-clients and unique stored program instructions that control the one or more transaction-clients to implement, in conjunction with certain non-transaction-client circuits, some, most, or all of the functions of a method for communication in a wireless OFDM system The non-transaction-client circuits may include, but are not limited to, a radio receiver, a radio transmitter, signal drivers, clock circuits, power source circuits, and user input devices. As such, these functions may be interpreted as steps of methods for communication in a wireless OFDM system Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Various embodiments of the present invention provide methods and system for wireless communication. More specifically, the present invention provides a method of communication in an OFDM system utilizing antenna diversity. The method involves receiving a plurality of receive-signals over a first set of antennas. Further, one or more of the plurality of receive-signals are cyclically delayed to generate one or more cyclically delayed receive-signals. Subsequently, one or more of the plurality of receive-signals are combined with one or more of the cyclically delayed receive-signals. In other words, the method involves performing receive Cyclic Delay Diversity (CDD). In an embodiment of the present invention, receive-CDD is performed at a Base Station (BS) which also performs transmit-CDD. As a result, channel relationship between the BS and a Subscriber Station (SS) becomes symmetrical. Consequently, various efficient methods of communication can be carried out between the BS and the SS.

FIG. 1 illustrates a wireless communication system 100 in which various embodiments of the present invention may function. Wireless communication system 100 includes one or more BSs in communication with one or more SSs. For example, as depicted in FIG. 1, a BS 102 communicates with a SS 104 and vice-versa. More specifically, BS 102 transmits signals to SS 104 via a downlink channel 106 while SS 104 transmits signals to BS 102 via an uplink channel 108.

In order to communicate wirelessly, each of BS 102 and SS 104 has one or more antennas. For example, an antenna 110 and an antenna 112 are present at BS 102 for performing each of transmission and reception of signals. Similarly, an antenna 114 and an antenna 116 are present at SS 104 for performing each of transmission and reception of signals. Signal transmissions from each of antenna 110 and antenna 112 may arrive at each of antenna 114 and antenna 116 through a multitude of spatial paths which is collectively represented as downlink channel 106. Similarly, a multitude of spatial paths for a transmission from each of antenna 114 and antenna 116 to each of antenna 110 and antenna 112 is collectively represented as uplink channel 108.

Further, each of BS 102 and SS 104 may employ antenna diversity techniques to mitigate adverse effects in each of downlink channel 106 and uplink channel 108. For example, BS 102 may employ transmit Cyclic Delay Diversity (CDD) by transmitting a signal via antenna 110 and simultaneously transmitting a cyclically delayed version of the signal via antenna 112. Each of the signal and the cyclically delayed version of the signal traverse through downlink channel 106 towards SS 104. At SS 104, each of antenna 114 and antenna 116 receive each of the signal and the cyclically delayed version of the signal. By transmitting the cyclically delayed version of the signal, the frequency selectivity of downlink channel 106 is enhanced thus improving communication through downlink channel 106.

As another example of the use of antenna diversity in wireless communication system 100, SS 104 may employ Maximum Ratio Combiner (MRC) technique in order to improve reception through downlink channel 106. Signals received from each of antenna 114 and antenna 116 which correspond to a transmitted signal may be combined in such a manner that the average SNR is maximized. More specifically, signals received from each of antenna 114 and antenna 116 is amplified by an amount proportional to the SNR of the corresponding antenna. As a result, there is an increase in signal strength at SS 104 due to simultaneously using each of antenna 114 and antenna 116 for reception.

Although wireless communication system 100 depicts the use of multiple antennas at each of BS 102 and SS 104, one skilled in the art would realize that one of BS 102 and SS 104 may use a single antenna for the purpose of communication. For example, BS 102 may transmit signals over each of antenna 110 and antenna 112 while SS 104 may receive the transmitted signals only over antenna 114. Further, one skilled in the art would realize that each of BS 102 and SS 104 may use a first set of antennas for transmission and a second set of antennas for reception. Alternatively, each of BS 102 and SS 104 may use a single set of antennas for both transmission and reception.

Figure 2:
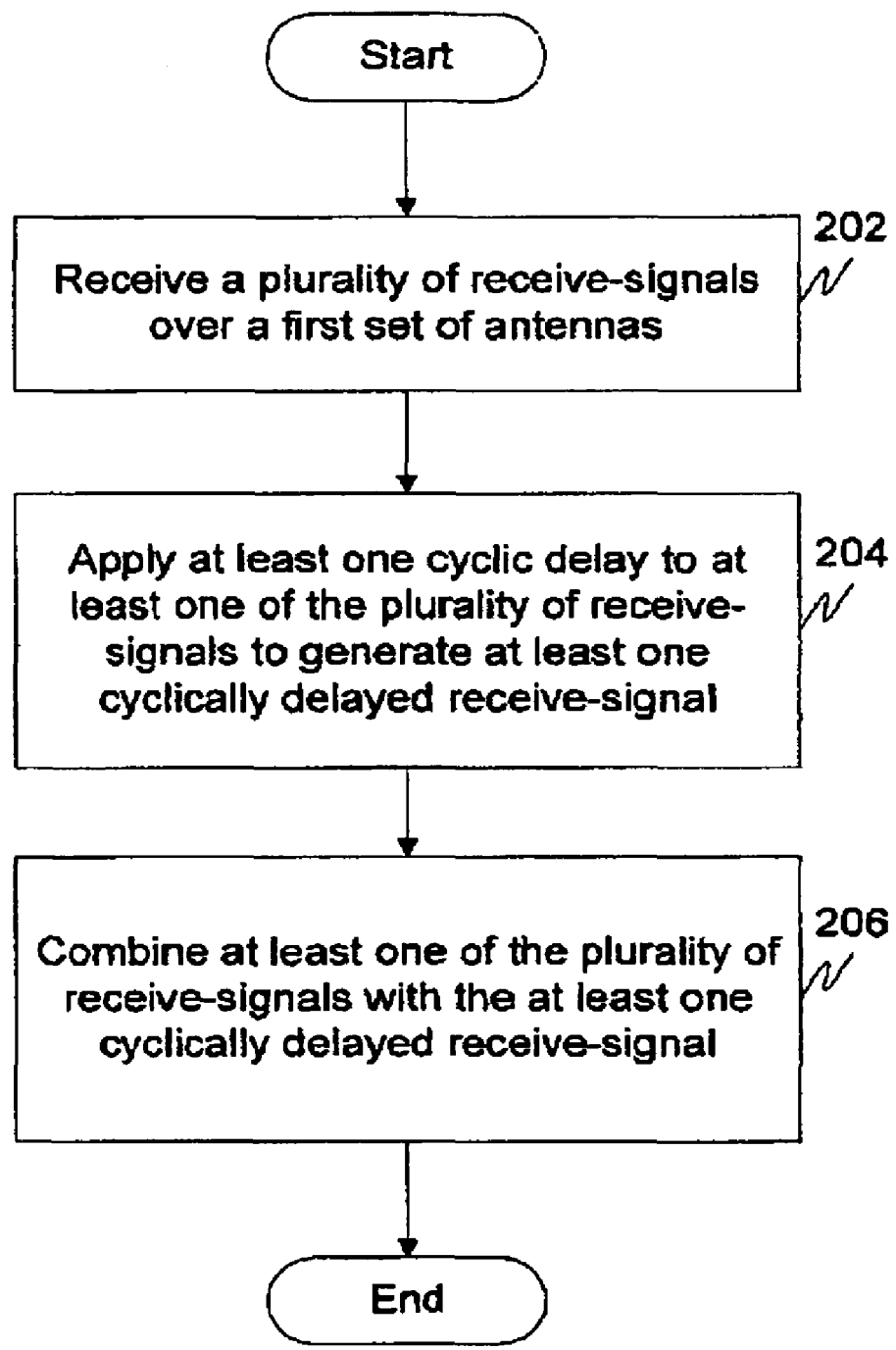
FIG. 2 illustrates a flow diagram of a method of communication in a wireless communication system in accordance with an embodiment of the present invention.

Turning now to FIG. 2, a flow diagram of a method of communication in wireless communication system 100 in accordance with an embodiment of the present invention is shown. At step 202, a plurality of receive-signals is received over a first set of antennas. The plurality of receive-signals corresponds to a first OFDM signal. Further, the plurality of receive-signals is received over a first set of sub-carriers. For example, a plurality of receive-signals may be received over antenna 110 and antenna 112 at BS 102. The plurality of receive-signals corresponds to a first OFDM signal transmitted by SS 104 over a first set of sub-carriers by one or more of antenna 114 and antenna 116. In other words, each of the plurality of receive-signals is generated as a result of the corresponding antenna intercepting transmission of the first OFDM signal through uplink channel 108.

The first OFDM signal may arrive at each of the first set of antennas through various spatial paths in uplink channel 108. The collection of all spatial paths of transmission converging at an antenna represents the channel of the antenna. Therefore, each of the plurality of receive-signals received at a corresponding antenna is the result of a transmission of the first OFDM signal arriving at the corresponding antenna through a corresponding channel.

Subsequent to receiving the plurality of receive-signals, a cyclic prefix may be removed from each of the plurality of receive signals if the cyclic prefix was appended in each of the plurality of receive signals before transmission.

Thereafter, one or more cyclic delays are applied to one or more of the plurality of receive-signals to generate one or more cyclically delayed receive-signals at step 204. For example, a receive-signal corresponding to antenna 112 may be cyclically delayed by δ ms. Cyclic delay may be applied to a receive-signal by obtaining a frequency domain representation of the receive-signal, and applying a phase ramp to the frequency domain representation over the first set of sub-carriers. The amount of cyclic delay applied is controlled by varying the slope of the phase ramp. In other words, a slope of the phase ramp applied to a receive signal is proportional to a desired cyclic delay applied to the receive-signal. As a result, a cyclic delay may be selectively introduced in only a subset of the first set of sub-carriers. In another embodiment of the present invention, a cyclic delay may be applied to a receive-signal by cyclically shifting samples corresponding to the receive-signal in time domain.

Subsequent to the generation of one or more cyclically delayed receive-signals, at step 206, one or more of the plurality of receive-signals are combined with one or more of the cyclically delayed receive-signal. For example, subsequent to generating a cyclically delayed receive-signal corresponding to antenna 112, receive-signal corresponding to antenna 110 may be combined with the cyclically delayed receive-signal to produce a combined signal. Thereafter, the combined signal is further processed to obtain data transmitted in the first OFDM signal. Thus, the plurality of receive-signals generated at the first set of antennas is processed by a receive-CDD diversity technique.

In various embodiments of the present invention, the first set of antennas is also used for transmission by employing a transmit-CDD diversity technique. Therefore, as a result of performing receive-CDD of the plurality of receive-signals received at the first set of antennas, channel reciprocity is achieved. For example, as a result of performing receive-CDD at BS 102, channel between BS 102 and SS 104 becomes reciprocal. In other words, the channel properties between BS 102 and SS 104 become symmetrical. As a result, efficient methods of allocating sub-carriers to SS 104 for downlink transmission are possible. This is explained in detail in conjunction with FIG. 3. Further, as a result of channel reciprocity, efficient methods of allocating sub-carriers to SS 104 for uplink transmission are also possible. These methods of allocating sub-carriers to SS 104 for uplink transmission are further explained in detail in conjunction with FIG. 4, FIG. 5 and FIG. 6.

As disclosed earlier, the use of receive-CDD for processing the plurality of receive-signals at the first set of antennas restores channel reciprocity. In an embodiment of the present invention, receive-CDD may be performed at a BS. Consequently, a channel between the BS and a SS becomes reciprocal. This channel reciprocity may be used to efficiently determine channel state information (CSI) of the channel, and establish communication between the BS and the SS based on the CSI of the channel. More specifically, the use of receive-CDD enables efficient determination of downlink channel of the SS. In other words, the use of receive-CDD enables efficient allocation of sub-carriers to the SS for downlink transmission.

Figure 3:
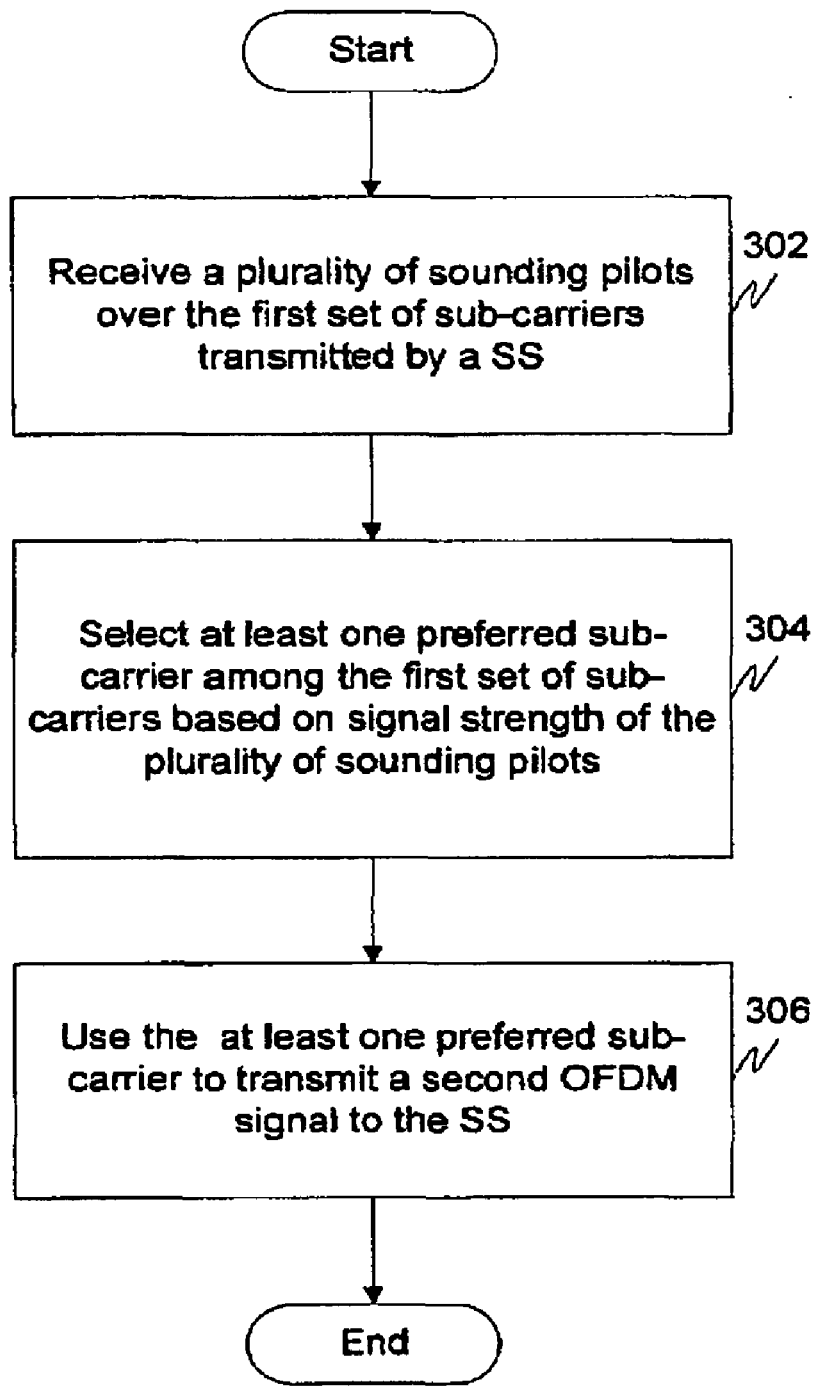
FIG. 3 illustrates a flow diagram of a method of allocating sub-carriers to a Subscriber Station (SS) for downlink transmission in a wireless communication system in accordance with an embodiment of the present invention.

FIG. 3 illustrates a flow diagram of a method of allocating sub-carriers to a Subscriber Station (SS) for downlink transmission in wireless communication system 100 in accordance with an embodiment of the present invention. At step 302, a plurality of sounding pilots are received over the first set of sub-carriers. The plurality of sounding pilots may be transmitted over the first set of sub-carriers by a SS in order to determine response of channel to each sub-carrier of the first set of sub-carriers. For example, SS 104 may transmit a plurality of sounding pilots over a set of sub-carriers. Thereafter, BS 102 may receive the plurality of sounding pilots transmitted over the set of sub-carriers.

The plurality of sounding pilots transmitted over the first set of sub-carriers are received at the first set of antennas, and are processed using receive-CDD diversity technique as described in FIG. 2. Subsequently, at step 304, one or more preferred sub-carriers among the first set of sub-carriers are selected based on signal strength of the plurality of sounding pilots. More specifically, the one or more preferred sub-carriers selected from the first set of sub-carriers have greater signal strength compared to other sub-carriers of the first set of sub-carriers. Owing to their greater signal strength, the one or more preferred sub-carriers may be preferably used for communicating across the channel.

Consequently, at step 306, the one or more preferred sub-carriers are used to transmit a second OFDM signal to the SS over the first set of antennas. The second OFDM signal is transmitted over the first set of antennas using a transmit-CDD diversity technique. More specifically, firstly, one or more cyclic delays are applied to one or more of a plurality of transmit-signals corresponding to the second OFDM signal to generate one or more cyclically delayed transmit-signals. The one or more cyclic delays applied to one or more of the plurality of transmit-signals is the same as the one or more cyclic delays applied to the one or more of the plurality of receive-signals. For example, a cyclic delay applied to a transmit-signal transmitted from antenna 112 is the same as the cyclic delay applied to a receive-signal received at antenna 112.

Subsequently, at least one of the one or more cyclically delayed transmit-signals and one or more of the plurality of transmit signals are transmitted by the first set of antennas over the one or more preferred sub-carriers. For example, BS 102 may transmit each of a transmit-signal and a cyclically delayed transmit signal over the one or more preferred sub-carriers towards SS 104 via downlink channel 106. Thereafter, owing to channel reciprocity established by the use of receive-CDD at BS 102, SS 104 may use the preferred sub-carriers for transmitting signals to BS 102 via uplink channel 108. As a result, no additional feedback information is required to be transmitted from BS 102 to SS 104 with regard to the sub-carriers to be used for transmission via uplink channel 108. In other words, BS 102 may allocate a set of sub-carriers to SS 104 for transmission through uplink channel 108, and further use the set of sub-carriers to transmit signals to SS 104 through downlink channel 106. Without the need for any further information, SS 104 may reuse the set of sub-carriers for transmission through uplink channel 106 since channel characteristics are reciprocal. Thus, the use of receive-CDD at BS 102 simplifies allocation of sub-carriers to SS 104 for transmission through uplink channel 108. This is further explained in detail in different embodiments in conjunction with FIG. 4 and FIG. 5. Further, since selection of the preferred-subcarriers based on signal strength is performed at BS 102 rather than SS 104, complexity of SS 104 is reduced.

Figure 4:
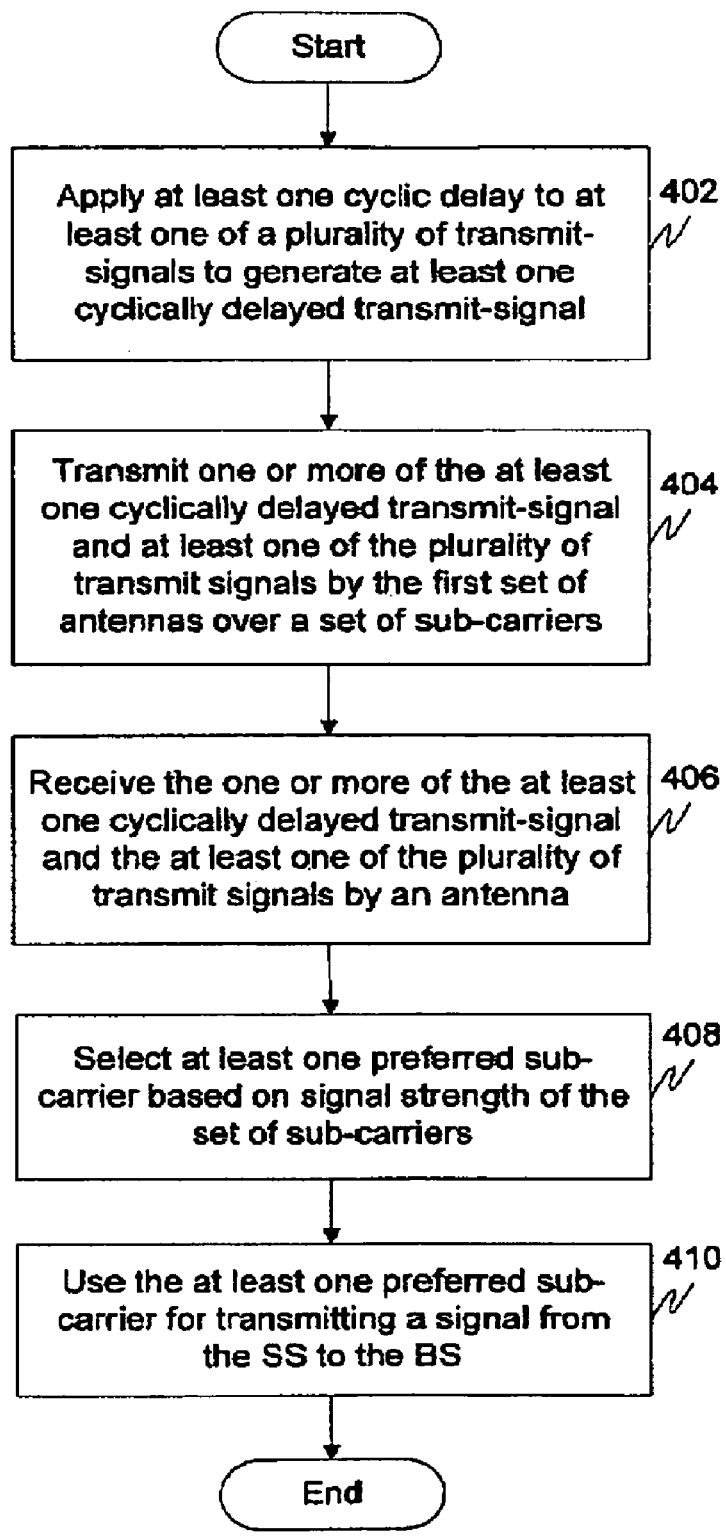
FIG. 4 illustrates a flow diagram of a method of allocating sub-carriers to a single-antenna SS for uplink transmission in a wireless communication system in accordance with an embodiment of the present invention.

Turning now to FIG. 4, a flow diagram of a method of allocating sub-carriers to a single-antenna SS for uplink transmission in wireless communication system 100 in accordance with an embodiment of the present invention is shown. The method is an efficient way of allocating sub-carriers to one or more SSs by taking advantage of channel reciprocity between the BS and the one or more SSs. Channel reciprocity between the BS and the one or more SSs is established by the use of receive-CDD at the BS as described in conjunction with FIG. 2. Further to this, at step 402, one or more cyclic delays are applied to one or more of a plurality of transmit-signals to generate one or more cyclically delayed transmit-signals. The one or more cyclic delays applied to one or more of the plurality of transmit-signals is the same as the one or more cyclic delays applied to the one or more of the plurality of receive-signals. For example, a cyclic delay applied to a transmit-signal transmitted from antenna 112 is the same as the cyclic delay applied to a receive-signal received at antenna 112.

Subsequently, at step 404, at least one of the one or more cyclically delayed transmit-signals and one or more of the plurality of transmit signals are transmitted by the first set of antennas over a set of sub-carriers. For example, BS 102 may transmit a transmit-signal at antenna 110 over a set of sub-carriers towards SS 104 via downlink channel 106. Additionally, BS 102 may transmit a cyclically delayed transmit signal at antenna 112 over the set of sub-carriers towards SS 104 via downlink channel 106. The plurality of transmit-signals may correspond to an OFDM signal. In an embodiment of the present invention, the plurality of transmit-signals may be a plurality of sounding pilots. Thereafter, at step 406, at least one of the one or more cyclically delayed transmit-signals and the one or more of the plurality of transmit-signals are received by an antenna located at a SS. For example, antenna 114 may receive each of the transmit-signal transmitted by antenna 110 and the cyclically delayed transmit-signal transmitted by antenna 112.

Subsequently, at step 408, one or more preferred sub-carriers are selected based on signal strength of the set of sub-carriers at the SS. More specifically, signal strength of each of the set of sub-carriers is measured at the SS, and thereafter, one or more sub-carriers having greater signal strength relative to other sub-carriers are selected as preferred sub-carriers. Since each of the set of sub-carriers are transmitted with uniform signal strength by the BS, one or more sub-carriers having relatively greater signal strength indicate that the one or more sub-carriers are less affected by adverse channel effects and hence are preferred over other sub-carriers. Consequently, since channel between the BS and the SS is reciprocal, at step 410, the one or more preferred sub-carriers are used to transmit a signal from the SS to the BS. For example, antenna 114 may transmit a signal to BS 102 over the one or more preferred sub-carriers. Alternatively, in another embodiment of the present invention, SS 104 may transmit a signal to BS 102 over the one or more preferred sub-carriers using each of antenna 114 and antenna 116. This is further explained in detail in conjunction with FIG. 5. Thus, the use of receive-CDD at the BS simplifies allocation of sub-carriers to SSs for transmission from the SS to the BS. In another embodiment of the present invention, the method of communication disclosed in FIG. 4 may be used for selecting a preferred set of sub-carriers for transmission of signals from the SS to the BS based on Band adaptive Modulation and Coding (BAMC) scheme of 802.16e standard or any other similar scheme.

Figure 5:
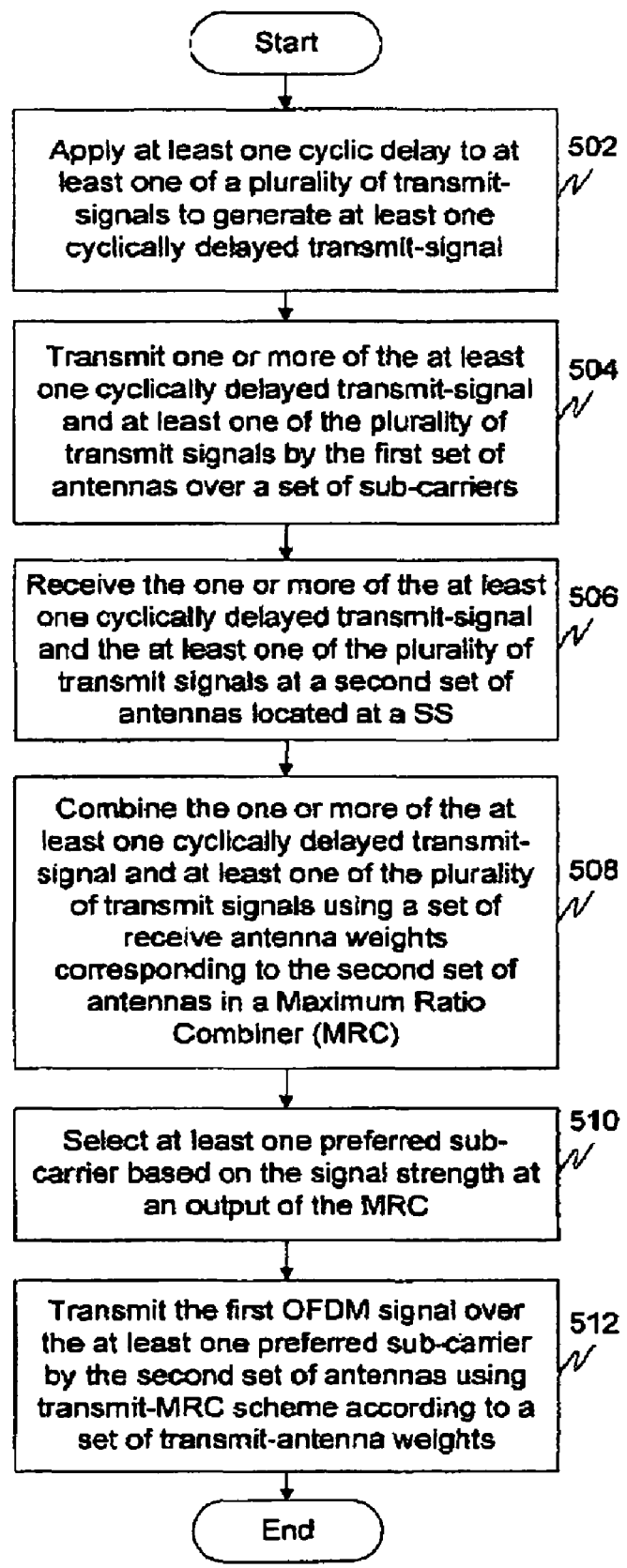
FIG. 5 illustrates a flow diagram of a method of allocating sub-carriers to a multiple-antenna SS for uplink transmission using Maximum Ratio Combining (MRC) diversity technique in a wireless communication system in accordance with an embodiment of the present invention.

Turning now to FIG. 5, a flow diagram of a method of allocating sub-carriers to a multiple-antenna SS for uplink transmission using Maximum Ratio Combining (MRC) diversity technique in wireless communication system 100 in accordance with an embodiment of the present invention is shown. This method exploits the presence of multiple antennas at SSs by performing antenna diversity for each of reception and transmission of signals at the SS. As described earlier in conjunction with FIG. 2, the use of receive-CDD at the BS establishes channel reciprocity between the BS and one or more SSs. Further to this, at step 502, one or more cyclic delays are applied to one or more of a plurality of transmit-signals to generate one or more cyclically delayed transmit-signals. The one or more cyclic delays applied to one or more of the plurality of transmit-signals is the same as the one or more cyclic delays applied to the one or more of the plurality of receive-signals. For example, a cyclic delay applied to a transmit-signal transmitted from antenna 112 is the same as the cyclic delay applied to a receive-signal received at antenna 112.

Subsequently, at step 504, at least one of the one or more cyclically delayed transmit-signals and one or more of the plurality of transmit signals are transmitted by the first set of antennas over a set of sub-carriers. For example, BS 102 may transmit a transmit-signal at antenna 110 over a set of sub-carriers towards SS 104 via downlink channel 106. Additionally, BS 102 may transmit a cyclically delayed transmit signal at antenna 112 over the set of sub-carriers towards SS 104 via downlink channel 106. The plurality of transmit-signals may correspond to an OFDM signal. In an embodiment of the present invention, the plurality of transmit-signals may be a plurality of sounding pilots.

Thereafter, at step 506, at least one of the one or more cyclically delayed transmit-signals and the one or more of the plurality of transmit-signals are received by a second set of antennas located at a SS. For example, each of antenna 114 and antenna 116 may receive each of the transmit-signal transmitted by antenna 110 and the cyclically delayed transmit-signal transmitted by antenna 112. More generally, a plurality of antennas located at the SS may simultaneously receive the at least one of the one or more cyclically delayed transmit-signals and the one or more of the plurality of transmit-signals. In other words, the SS uses an antenna diversity scheme for reception.

Consequently, at step 508, the at least one of the one or more cyclically delayed transmit-signals and the one or more of the plurality of transmit-signals are, combined in a Maximum Ratio Combiner (MRC) using a set of receive-antenna weights corresponding to the second set of antennas. More specifically, a receive-antenna weight associated with an antenna belonging to the second set of antennas is proportional to the SNR of the signal received at the antenna. As a result, signals with better SNR are enhanced. Consequently, the SNR of the combined signal is maximized.

Subsequently, at step 510, one or more preferred sub-carriers are selected based on the signal strength at an output of the MRC. More specifically, a sub-carrier having relatively greater signal strength is selected as a preferred sub-carrier. Since channel between the BS and the SS is reciprocal, the SS may use the preferred sub-carrier for transmission of signals from the SS to the BS. In other words, the SS may use the one or more preferred sub-carriers for transmission to the BS via the uplink channel 108.

Consequently, at step 512, the one or more preferred sub-carriers are used to transmit the first OFDM signal by the second set of antennas. Since multiple antennas are present at the SS, a transmit-diversity technique may be used to improve transmission of signals from the SS. Consequently, the first OFDM signal is transmitted by the second set of antennas using transmit-MRC scheme according to a set of transmit-antenna weights. In another embodiment of the present invention, the SS may use transmit-beamforming scheme for transmitting the first OFDM signal. This is explained in detail in conjunction with FIG. 6. The set of transmit-antenna weights determine the signal energy over each of the second set of antennas during transmission of the first OFDM signal. The set of transmit-antenna weights may be derived from one or more channel estimates corresponding to one or more of the second set of antennas. Alternatively, the set of transmit-antenna weights may be the same as the set of receive-antenna weights.

Figure 6:
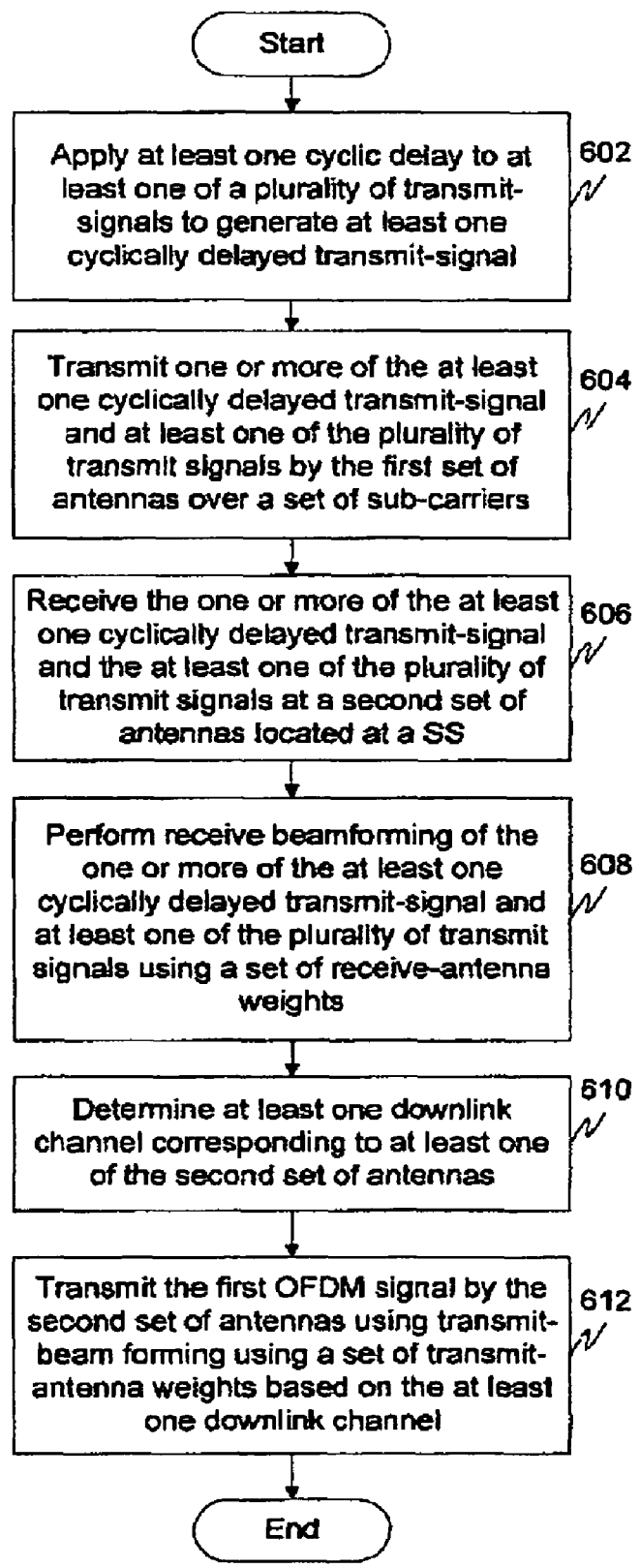
FIG. 6 illustrates a flow diagram of a method of allocating sub-carriers to a multiple-antenna SS for uplink transmission using beamforming diversity technique in a wireless communication system in accordance with an embodiment of the present invention.

Turning now to FIG. 6, a flow diagram of a method of allocating sub-carriers to a multiple-antenna SS for uplink transmission using beamforming diversity technique in wireless communication, system 100 in accordance with an embodiment of the present invention is shown. In this embodiment, channel reciprocity between the BS and the SS is exploited in the use of beamforming during each of reception and transmission at the SS. Channel reciprocity between the BS and the SS is established by the use of receive-CDD at the BS as described in conjunction with FIG. 2. Further to this, at step 602, one or more cyclic delays are applied to one or more of a plurality of transmit-signals to generate one or more cyclically delayed transmit-signals. The one or more cyclic delays applied to one or more of the plurality of transmit-signals is the same as the one or more cyclic delays applied to the one or more of the plurality of receive-signals. For example, a cyclic delay applied to a transmit-signal transmitted from antenna 112 is the same as the cyclic delay applied to a receive-signal received at antenna 112.

Subsequently, at step 604, at least one of the one or more cyclically delayed transmit-signals and one or more of the plurality of transmit signals are transmitted by the first set of antennas over a set of sub-carriers. For example, BS 102 may transmit a transmit-signal at antenna 110 over a set of sub-carriers towards SS 104 via downlink channel 106. Additionally, BS 102 may transmit a cyclically delayed transmit signal at antenna 112 over the set of sub-carriers towards SS 104 via downlink channel 106. The plurality of transmit-signals may correspond to an OFDM signal. In an embodiment of the present invention, the plurality of transmit-signals may be a plurality of sounding pilots.

Thereafter, at step 606, at least one of the one or more cyclically delayed transmit-signals and the one or more of the plurality of transmit-signals are received by a second set of antennas located at a SS. For example, each of antenna 114 and antenna 116 may receive each of the transmit-signal transmitted by antenna 110 and the cyclically delayed transmit-signal transmitted by antenna 112. More generally, a plurality of antennas located at the SS may simultaneously receive the at least one of the one or more cyclically delayed transmit-signals and the one or more of the plurality of transmit-signals. In other words, the SS uses an antenna diversity scheme for reception.

Consequently, at step 608, receive beamforming is performed on the at least one of the one or more cyclically delayed transmit-signals and the one or more of the plurality of transmit-signals using a set of receive-antenna weights corresponding to one or more of the second set of antennas. Subsequently, at step 610, one or more downlink channels corresponding to the one or more of the second set of antennas are determined. More specifically, downlink channel properties corresponding to one or more of the second set of antennas are determined. For example, complex frequency response of downlink channel corresponding to one or more of the second set of antennas may be determined. Subsequently, at step 612, based on the one or more downlink channels the SS transmits the first OFDM signal by the second set of antennas using transmit beamforming using a set of transmit-antenna weights. The set of transmit-antenna weights are the same as the set of receive-antenna weights used during receive beamforming at step 608.

In another embodiment of the present invention, the use of receive-CDD at BS 102 in wireless communication system 100 enables efficient scheduling of SS 104 in one or more of a downlink-BAMC zone and a downlink-beamforming zone. SS 104 may be switched between the downlink-BAMC zone and the downlink-beamforming zone based on one or more of mobility of SS 104 and standard deviation of power across frequency bands. More specifically, if the standard deviation of the power across frequency bands is too high, then SS 104 is switched from downlink-BAMC zone to downlink-beamforming zone.

Figure 7:
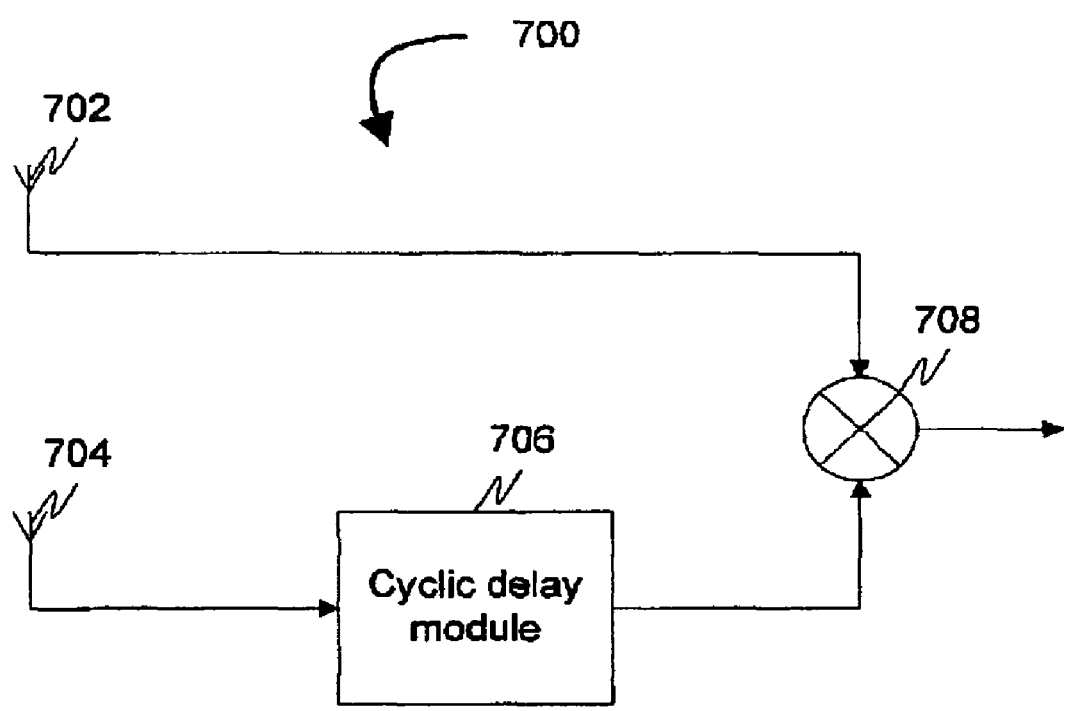
FIG. 7 illustrates a block diagram of a wireless communication system in accordance with an embodiment of the present invention.

Turning now to FIG. 7, a block diagram of a wireless communication system 700 in accordance with an embodiment of the present invention is illustrated. Wireless communication system 700 includes a first set of antennas. As an example, an antenna 702 and an antenna 704 are shown to be the first set of antennas in wireless communication system 700. The first set of antennas receives a plurality of receive-signals. The plurality of receive-signals corresponds to a first OFDM signal which is received over a first set of sub-carriers. For example, each of antenna 702 and antenna 704 may receive the first OFDM signal over the first set of sub-carriers. The first set of antennas may be spatially separated from each other in order to provide antenna diversity for receiving the plurality of receive-signals.

In order to provide antenna diversity, wireless communication system 700 includes one or more cyclic delay modules such as a cyclic delay module 706 and a combiner module 708. The one or more cyclic delay modules apply a cyclic delay to one or more of the plurality of receive-signals to generate one or more cyclically delayed receive-signals. For example, cyclic delay module 706 applies a cyclic delay to a receive-signal corresponding to antenna 704 to generate a cyclically delayed receive-signal. Cyclic delay module 706 may apply the cyclic delay to the receive-signal by processing a time domain representation of the receive-signal. Alternatively, and preferably, cyclic delay module 706 may process a frequency domain representation of the receive-signal in order to apply the cyclic delay. This is further explained in detail in conjunction with FIG. 8.

Subsequent to the generation of the one or more cyclically delayed receive-signals, combiner module 708 combines the one or more cyclically delayed receive-signals with the plurality of receive-signals. For example, combiner module 708 combines the cyclically delayed receive-signal corresponding to antenna 704 with the receive-signal corresponding to antenna 702. As a result, wireless communication system 700 provides receive-CDD for receiving the plurality of receive-signals over the first set of antennas. In an embodiment of the present invention, wireless communication system 700 may be located at a BS. In another embodiment, wireless communication system 700 may be located at a SS. In various further embodiments of the present invention it is possible to provide efficient methods of allocating sub-carriers to a SS for communication between the BS and the SS. This is further explained in detail in conjunction with FIG. 9, FIG. 10, FIG. 11 and FIG. 12.

Although wireless communication system 700 is shown to include two antennas, one skilled in the art would realize that wireless communication system 700 may include more than two antennas. Still further, each of antenna 702 and antenna 704 may perform each of transmission and reception of signals. Alternatively, each of antenna 702 and antenna 704 may perform only reception of signals.

Figure 8:
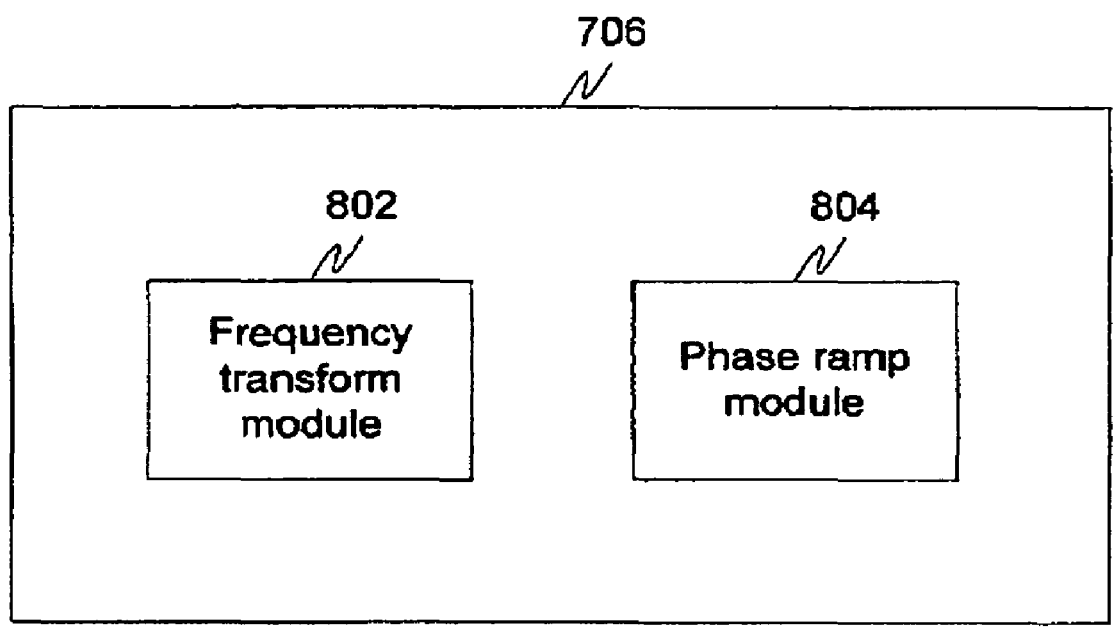
FIG. 8 illustrates a block diagram of a cyclic delay module in accordance with an embodiment of the present invention.

Turning now to FIG. 8, a block diagram of cyclic delay module 706 in accordance with an embodiment of the present invention is shown. As described earlier, cyclic delay module 706 applies a cyclic delay to a receive-signal by processing a frequency domain representation of the receive-signal. In order to do so, cyclic delay module 706 includes a frequency transform module 802 to obtain a frequency domain representation of the receive signal, corresponding to antenna 704. More generally, a cyclic delay module in wireless communication system 700 includes one or more frequency transform modules to obtain a plurality of frequency domain representations corresponding to the plurality of receive-signals. The one or more frequency domain representations may be, for example, Fourier transforms produced using a Fast Fourier Transform (FFT) algorithm. Therefore, the frequency domain representation of a receive-signal represents amplitude and phase of the first set of sub-carriers constituting the receive-signal.

By transforming the receive-signal into a frequency domain representation, a cyclic delay may be selectively applied on one or more sub-carriers of the first set of sub-carriers constituting the receive-signal. In order to apply a cyclic delay on one or more sub-carriers, cyclic delay module 706 includes a phase ramp module 804. Phase ramp module 804 applies a phase ramp over the first set of sub-carriers to a frequency domain representation of the receive-signal. The slope of the phase ramp applied to the receive-signal is proportional to a desired cyclic delay applied to the receive-signal. As a result, a cyclically delayed receive signal is generated. Subsequently, the cyclically delayed receive-signal is combined with a receive-signal corresponding to antenna 702 as described previously in conjunction with FIG. 7.

Figure 9:
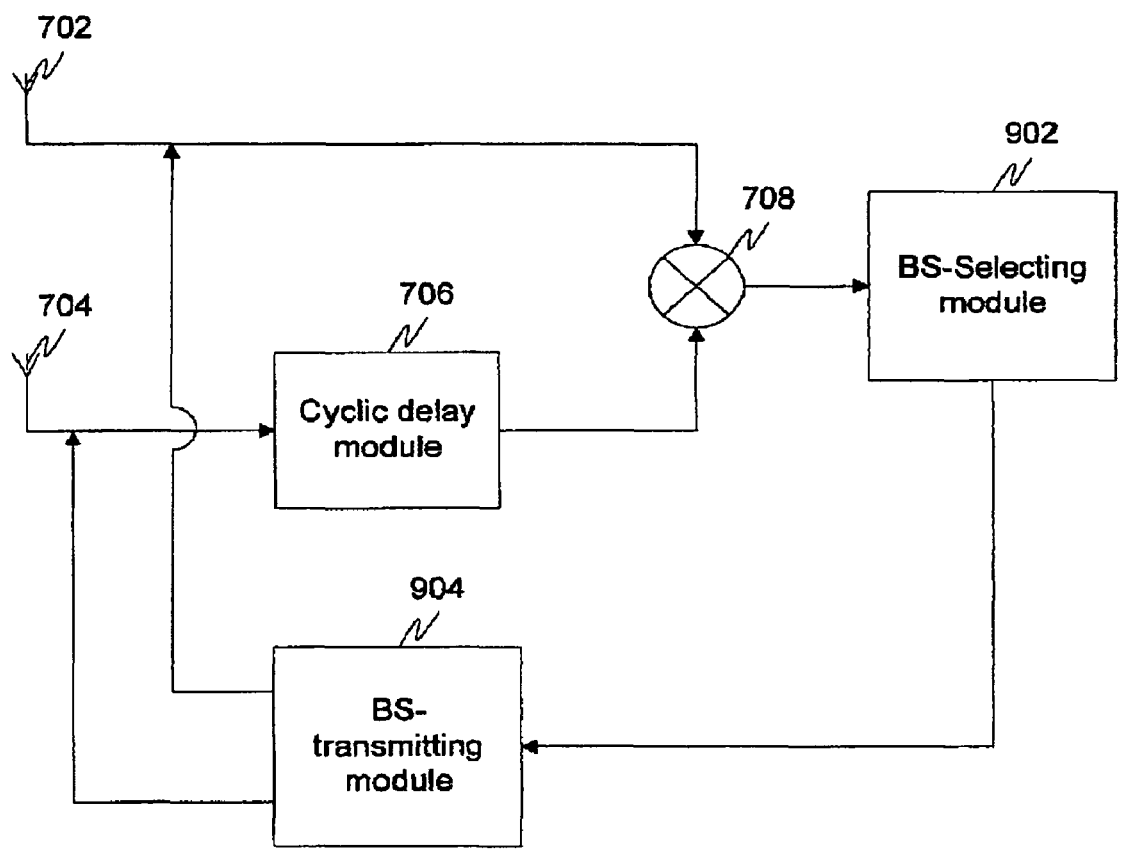
FIG. 9 illustrates a block diagram of a wireless communication system for allocating sub-carriers to a Subscriber Station (SS) for downlink transmission in accordance with an embodiment of the present invention.

Turning now to FIG. 9, a block diagram of wireless communication system 700 for allocating sub-carriers to a Subscriber Station (SS) for downlink transmission in accordance with an embodiment of the present invention is shown. In this embodiment of the present invention, wireless communication system 700 is located at a BS. Further, wireless communication system 700 includes a BS selecting module 902 and a BS transmitting module 904. The BS communicates with one or more SS (not shown in the figure). More specifically, in the present embodiment a SS may transmit a plurality of sounding pilots over a first set of sub-carriers in order to determine response of channel to each sub-carrier of the first set of sub-carriers. Subsequently, the plurality of sounding pilots are received at each of antenna 702 and antenna 704. Further, receive-CDD is performed on the plurality of sounding pilots as described earlier in conjunction with FIG. 7. Thereafter, BS selecting module 902 selects one or more preferred sub-carriers among the first set of sub-carriers based on signal strength of a plurality of sounding pilots. More specifically, the one or more preferred sub-carriers selected from the first set of sub-carriers have greater signal strength compared to other sub-carriers of the first set of sub-carriers. Thus, BS selecting module 902 selects one or more preferred sub-carriers which are favorable to use for transmission through channel between the SS and the BS.

Consequently, BS transmitting module 904 uses the one or more preferred sub-carriers to transmit a second OFDM signal to the SS. In order to transmit the second OFDM signal, BS transmitting module 904 applies one or more cyclic delays to a plurality of transmit-signals corresponding to the second OFDM signal to generate one or more cyclically delayed transmit-signal. Importantly, the one or more cyclic delays applied to the one or more of the plurality of transmit-signals is the same as the one or more cyclic delays applied to the one or more of the plurality of receive-signals. Subsequently, at least one of the one or more of the cyclically delayed transmit-signals and one or more of the plurality of transmit-signals are transmitted by each of antenna 702 and antenna 704 over the one or more preferred sub-carriers to the SS.

Thereafter, owing to channel reciprocity established by the use of receive-CDD at the BS, the SS may use the one or more preferred sub-carriers for transmitting signals to the BS. As a result, no additional feedback information is required to be transmitted from the BS to the SS with regard to the sub-carriers to be used for transmission through uplink channel. In other words, the BS may allocate a set of sub-carriers to the SS for transmission through uplink channel, and further use the set of sub-carriers to transmit signals to the SS through downlink channel. Without the need for any further information, the SS may use the set of sub-carriers for transmission through uplink channel since channel characteristics are reciprocal. Thus, the use of receive-CDD at the BS simplifies allocation of sub-carriers to the SS for transmission through uplink channel.

Figure 10:
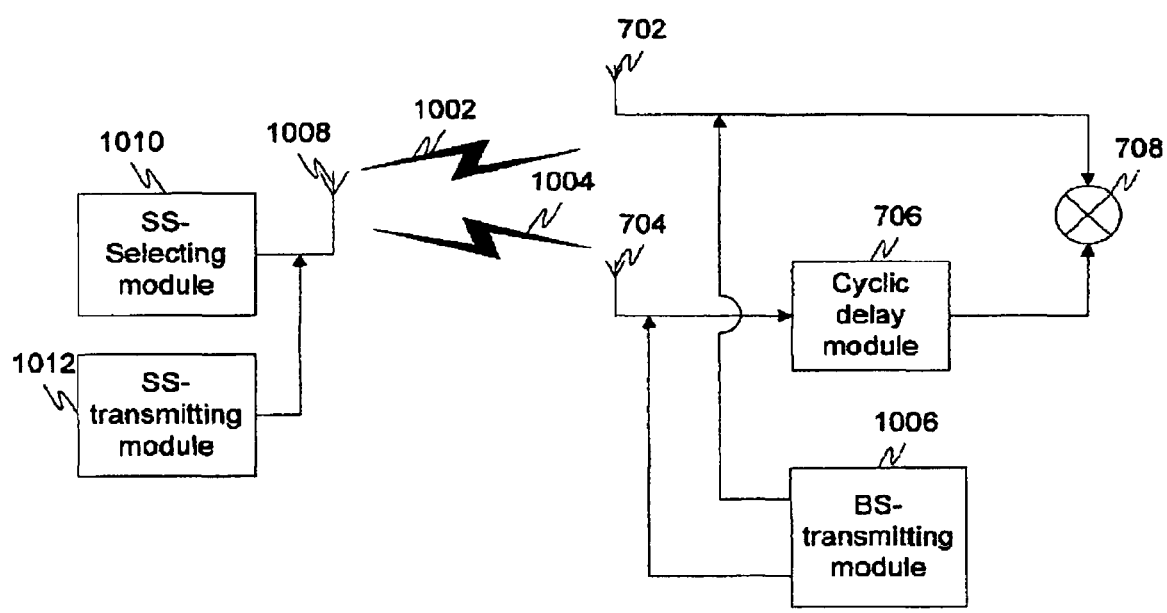
FIG. 10 illustrates a block diagram of a wireless communication system for allocating sub-carriers to a single-antenna SS for uplink transmission in accordance with an embodiment of the present invention.

Turning now to FIG. 10, a block diagram of wireless communication system 700 in accordance with an embodiment of the present invention is shown. In this embodiment, wireless communication system 700 is located at a BS. The BS communicates with an SS through each of a downlink channel 1002 and an uplink channel 1004. Particularly, wireless communication system 700 transmits an OFDM signal to the SS through downlink channel 1004. Further, wireless communication system 700 receives a plurality of receive-signals over each of antenna 702 and antenna 704 through uplink channel 1004. Subsequently, receive-CDD is performed on the plurality of receive signals as described earlier in conjunction with FIG. 7.

In order to transmit the OFDM signal to the SS, wireless communication system 700 further includes a BS transmitting module 1006 which applies one or more cyclic delays to a plurality of transmit-signals corresponding to the OFDM signal to generate one or more cyclically delayed transmit-signals. Importantly, the one or more cyclic delays applied to the one or more of the plurality of transmit-signals is the same as the one or more cyclic delays applied to the one or more of the plurality of receive-signals. More specifically, a cyclic delay applied to a transmit-signal corresponding to antenna 704 is the same as the cyclic delay applied to a receive-signal corresponding to antenna 704. Subsequently, at least one of the one or more of the cyclically delayed transmit-signals and one or more of the plurality of transmit-signals are transmitted by each of antenna 702 and antenna 704 over a set of sub-carriers through downlink channel 1004 towards the SS.

Wireless communication system 700 further includes an antenna 1008. The antenna 1008 is located at the SS. Antenna 1008 receives at least one of the one or more cyclically delayed transmit-signal and the one or more of the plurality of transmit-signals over the set of sub-carriers. In other embodiments of the present invention, the SS may include more than one antenna, and may perform a receive-diversity technique on the at least one of the one or more cyclically delayed transmit-signal and the one or more of the plurality of transmit-signals. These embodiments are further explained in detail in conjunction with FIG. 11 and FIG. 12.

Subsequent to receiving the at least one of the one or more cyclically delayed transmit-signal and the one or more of the plurality of transmit-signals over the set of sub-carriers at antenna 1008, the SS may select one or more sub-carriers from the set of sub-carriers for use in uplink transmission to the BS. In order to do so, a SS selecting module 1010, located at the SS, selects one or more preferred-sub-carriers based on signal strength corresponding to one or more of the set of sub-carriers. More specifically, signal strength of each of the set of sub-carriers is measured by SS selecting module 1010, and thereafter, one or more sub-carriers having greater signal strength relative to other sub-carriers are selected as preferred sub-carriers. Since each of the set of sub-carriers are transmitted with uniform signal strength by BS transmitting module 1006, one or more sub-carriers having relatively greater signal strength indicate that the one or more sub-carriers are less affected by adverse channel effects and hence are preferred over other sub-carriers. Consequently, since channel between the BS and the SS is reciprocal, the one or more preferred sub-carriers may be used to transmit a signal from the SS to the BS. In order to do so, the SS includes a SS transmitting module 1012 to transmit a signal from the SS to the BS using the one or more preferred sub-carriers. Thus, the use of receive-CDD at the BS simplifies allocation of sub-carriers to the SS for transmission from the SS to the BS through uplink channel 1004.

Figure 11:
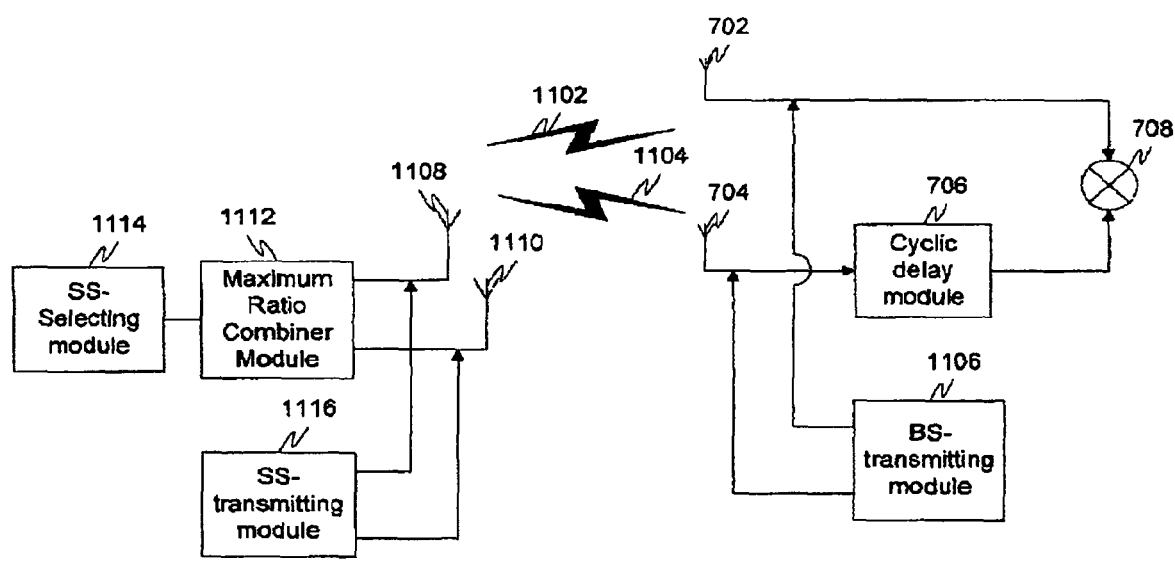
FIG. 11 illustrates a block diagram of a wireless communication system for allocating sub-carriers to a multiple-antenna SS for uplink transmission using Maximum Ratio Combining (MRC) diversity technique in accordance with an embodiment of the present invention.

Turning now to FIG. 11, a block diagram of wireless communication system 700 for allocating sub-carriers to a multiple-antenna SS for uplink transmission using Maximum Ratio Combining (MRC) diversity technique in an embodiment of the present invention is shown. In this embodiment, wireless communication system 700 is located at a BS. The BS communicates with an SS through each of a downlink channel 1102 and an uplink channel 1104. Particularly, wireless communication system 700 transmits an OFDM signal to the SS through downlink channel 1104. Further, wireless communication system 700 receives a plurality of receive-signals corresponding to the first OFDM signal over each of antenna 702 and antenna 704 through uplink channel 1104. Subsequently, receive-CDD is performed on the plurality of receive signals as described earlier in conjunction with FIG. 7.

In order to transmit the OFDM signal to the SS, wireless communication system 700 further includes a BS transmitting module 1106 applies one or more cyclic delays to a plurality of transmit-signals corresponding to the OFDM signal to generate one or more cyclically delayed transmit-signals. Importantly, the one or more cyclic delays applied to the one or more of the plurality of transmit-signals is the same as the one or more cyclic delays applied to the one or more of the plurality of receive-signals. More specifically, a cyclic delay applied to a transmit-signal corresponding to antenna 704 is the same as the cyclic delay applied to a receive-signal corresponding to antenna 704. Subsequently, at least one of the one or more of the cyclically delayed transmit-signals and one or more of the plurality of transmit-signals are transmitted by each of antenna 702 and antenna 704 over a set of sub-carriers through downlink channel 1104 towards the SS.

In order to receive the at least one of the one or more of the cyclically delayed transmit-signals and one or more of the plurality of transmit-signals, the SS includes a second set of antennas. For example, the second set of antennas includes each of antenna 1108 and antenna 1110 which receive the one or more of the at least one cyclically delayed transmit-signal and at least one of the plurality of transmit-signals. In other words, each of antenna 1108 and antenna 1110 provide receive-diversity at the SS. In the present embodiment, signals received at each of antenna 1108 and antenna 1110 are combined using Maximum Ratio Combiner (MRC) diversity. To this end, the SS includes a MRC module 1112 to perform receive-MRC of the one or more of the at least one cyclically delayed transmit-signal and at least one of the plurality of transmit-signals using a set of receive-antenna weights corresponding to each of antenna 1108 and antenna 1110. More specifically, a receive-antenna weight associated with an antenna belonging to the second set of antennas is proportional to the SNR of the signal received at the antenna. As a result, signals with better SNR are enhanced. Consequently, the SNR of the combined signal is maximized. In another embodiment, the SS may perform receive beamforming on at least one of the one or more cyclically delayed transmit-signals and one or more of the plurality of transmit-signals. This embodiment is further explained in detail in conjunction with FIG. 12.

Subsequent to receiving the OFDM signal transmitted by the BS, the SS transmits the first OFDM signal to the BS. In order to transmit the OFDM signal, the SS includes each of a SS selecting module 1114 and a SS transmitting module 1116. SS selecting module selects one or more preferred sub-carriers based on the signal strength at an output of MRC module 1112. More specifically, a sub-carrier having relatively greater signal strength is selected as a preferred sub-carrier. Since, channel between the BS and the SS is reciprocal, the SS may use the preferred sub-carrier for transmission of signals from the SS to the BS. In other words, the SS may use the one or more preferred sub-carriers for transmission to the BS via the uplink channel 1104.

Consequently, SS transmitting module 1116 uses the one or more preferred sub-carriers to transmit the first OFDM signal by each of antenna 1118 and antenna 1110. Since multiple antennas are present at the SS, a transmit-diversity technique may be used to improve transmission of signals from the SS. Therefore, the first OFDM signal is transmitted by each of antenna 1108 and antenna 1110 using transmit-MRC scheme according to a set of transmit-antenna weights. The set of transmit-antenna weights determine the signal energy one each of the second set of antennas during transmission of the first OFDM signal. The set of transmit-antenna weights may be derived from one or more channel estimates corresponding to one or more of the second set of antennas. Alternatively, the set of transmit-antenna weights may be the same as the set of receive-antenna weights.

Figure 12:
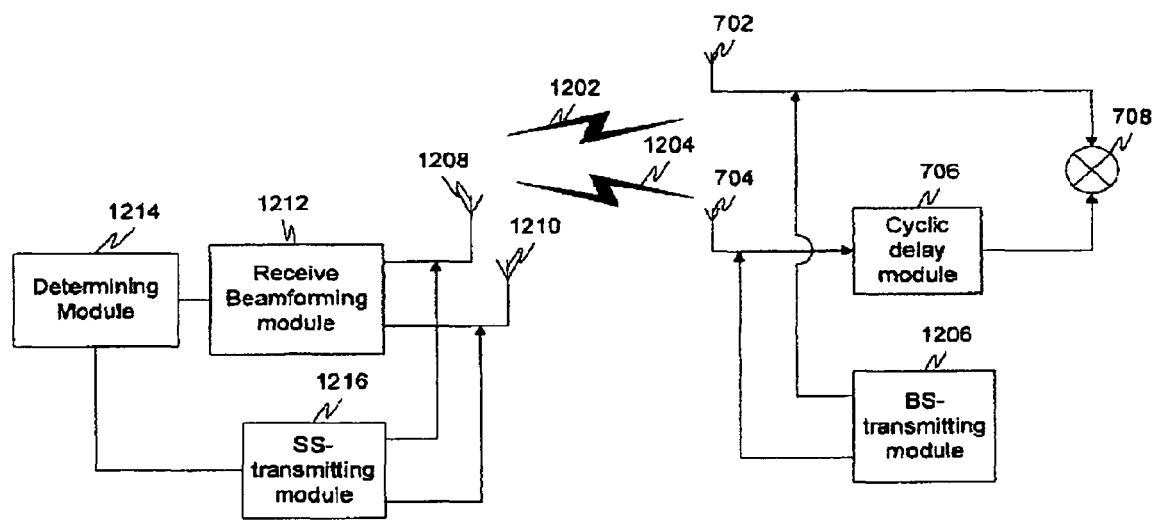
FIG. 12 illustrates a block diagram of a wireless communication system for allocating sub-carriers to a multiple-antenna SS for uplink transmission using beamforming diversity technique in accordance with an embodiment of the present invention.

Turning now to FIG. 12, a block diagram of wireless communication system 700 for allocating sub-carriers to a multiple-antenna SS for uplink transmission using beamforming diversity technique in accordance with an embodiment of the present invention is shown. In this embodiment, channel reciprocity between the BS and the SS is exploited in the use of beamforming during each of reception and transmission at the SS. In the present embodiment, wireless communication system 700 is located at a BS. The BS communicates with an SS through each of a downlink channel 1202 and an uplink channel 1204. Particularly, wireless communication system 700 transmits an OFDM signal to the SS through downlink channel 1204. Further, wireless communication system 700 receives a plurality of receive-signals corresponding to the first OFDM signal over each of antenna 702 and antenna 704 through uplink channel 1204. Subsequently, receive-CDD is performed on the plurality of receive signals as described earlier in conjunction with FIG. 7.

In order to transmit the OFDM signal to the SS, wireless communication system 700 further includes a BS transmitting module 1206 which performs the following steps. One or more cyclic delays are applied to a plurality of transmit-signals corresponding to the OFDM signal to generate one or more cyclically delayed transmit-signals. Importantly, the one or more cyclic delays applied to the one or more of the plurality of transmit-signals is the same as the one or more cyclic delays applied to the one or more of the plurality of receive-signals. More specifically, a cyclic delay applied to a transmit-signal corresponding to antenna 704 is the same as the cyclic delay applied to a receive-signal corresponding to antenna 704. Subsequently, at least one of the one or more of the cyclically delayed transmit-signals and one or more of the plurality of transmit-signals are transmitted by each of antenna 702 and antenna 704 over a set of sub-carriers through downlink channel 1204 towards the SS.

In order to receive the at least one of the one or more of the cyclically delayed transmit-signals and one or more of the plurality of transmit-signals, the SS includes a second set of antennas. For example, the second set of antennas includes each of antenna 1208 and antenna 1210 which receive the one or more of the at least one cyclically delayed transmit-signal and at least one of the plurality of transmit-signals. In other words, each of antenna 1208 and antenna 1210 provide receive-diversity at the SS. In the present embodiment, the receive-diversity scheme provided at the SS is receive beamforming. In order to do provide receive beamforming, the SS includes a receive beamforming module 1212. Receive beamforming module 1212 performs receive beamforming of at least one of the one or more cyclically delayed transmit-signal and one or more of the plurality of transmit-signals using a set of receive-antenna weights corresponding to each of antenna 1208 and antenna 1210. Further, the SS also includes a determining module 1214 for determining one or more downlink channels corresponding to at least one of the second set of antennas. Based on the downlink channels determined by determining module 1214, the SS may transmit a signal to the BS. To this end, the SS includes a SS transmitting module 1216 to transmit the first OFDM signal by each of antenna 1208 and antenna 1210 using transmit-beam forming using a set of transmit-antenna weights based on the at least one downlink channel. The set of transmit-antenna weights is the same as the set of receive-antenna weights.

Figure 13:
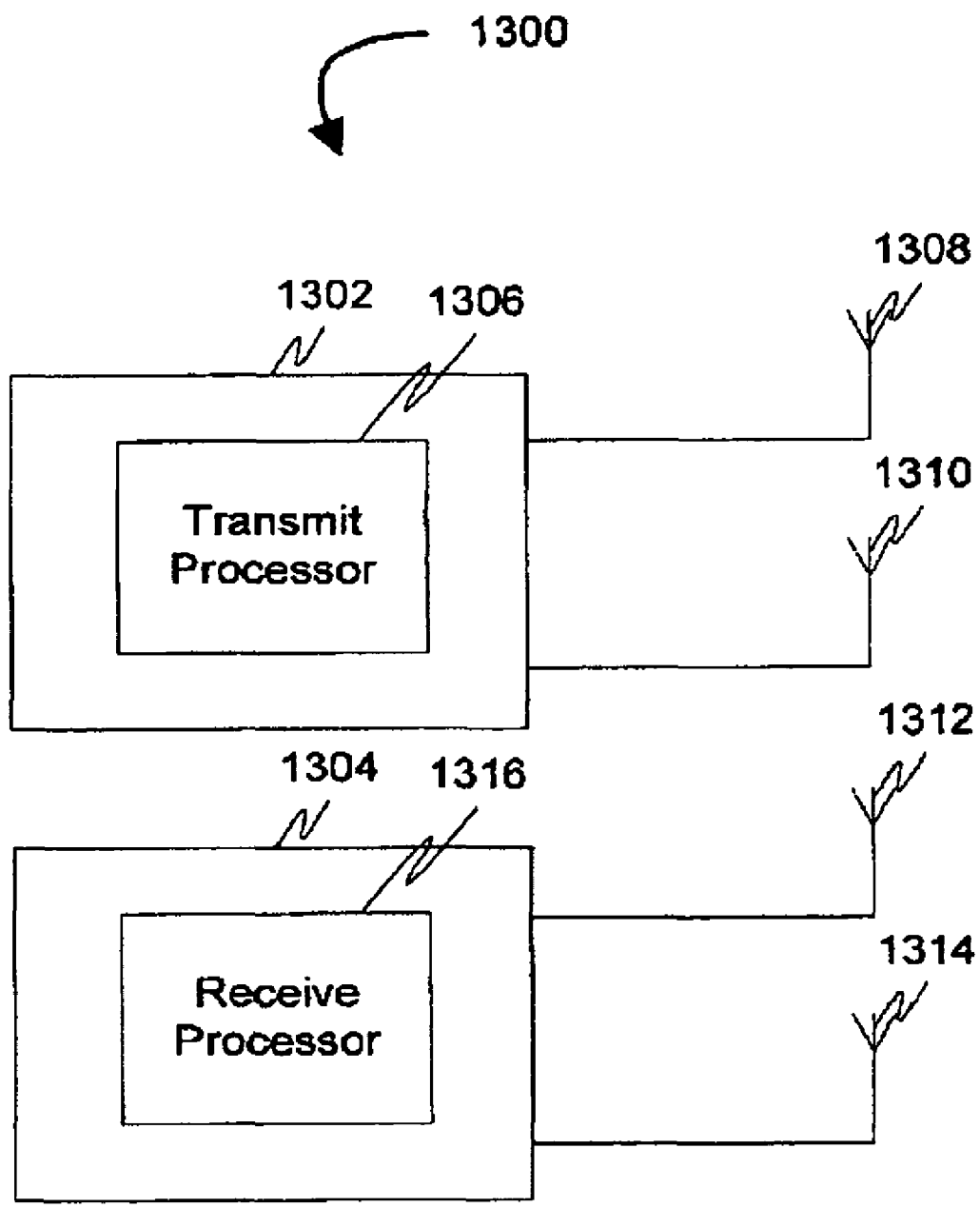
FIG. 13 Illustrates a block diagram of a BS transceiver in accordance with an embodiment of the present invention.

Turning now to FIG. 13, a block diagram of a BS transceiver 1300 in accordance with an embodiment of the present invention is shown. BS transceiver 1300 includes a transmitter 1302 and a receiver 1304. Transmitter 1302 in turn includes a transmit processor 1306. Transmit processor 1306 is configured to apply one or more cyclic delays to one or more of a plurality of transmit-signals to generate one or more cyclically delayed transmit-signals. In other words, transmit processor 1306 performs transmit-CDD in BS transceiver 1300. The plurality of transmit-signals corresponds to a first OFDM signal. Subsequently, in order to transmit the first OFDM signal, transmitter 1302 includes a plurality of transmitting antennas. For example, transmitter 1302 includes an antenna 1308 and an antenna 1310 to transmit at least one of the one or more cyclically delayed transmit-signals and one or more of the plurality of transmit-signals over a first of sub-carriers.

In order to receive signals, receiver 1304 includes a plurality of receive antennas. For example, receiver 1304 includes an antenna 1312 and an antenna 1314 to receive a plurality of receive-signals. The plurality of receive-signals corresponds to a second OFDM signal, which is received over a second set of sub-carriers. Receiver 1304 also includes a receive processor 1316 to apply one or more cyclic delays to one or more of the plurality of receive-signals to generate one or more cyclically delayed receive-signal. The one or more cyclic delays applied to the plurality of receive-signals are the same as the one or more cyclic delays applied to the plurality of transmit-signals. Further, receive processor 1316 combines the one or more of the plurality of receive-signals with the one or more cyclically delayed receive-signals. In other words, receive processor 1316 performs receive-CDD in BS transceiver 1300.

In an embodiment of the present invention, the plurality of transmit-antennas may be same as the plurality of receive-antennas. In other words, a single set of antennas may be used to perform each of transmission and reception of signals. As a result of performing each of transmit-CDD and receive-CDD at BS transceiver 1300, channel reciprocity is established between BS transceiver and a SS. Consequently, various efficient methods of allocating sub-carriers to one or more SSs for one or more of uplink transmission and downlink can be provided as described earlier in conjunction with FIG. 3, FIG. 4, FIG. 5 and FIG. 6.

Various embodiments of the present invention provide methods and systems for communication in a wireless OFDM communication system. Primarily, by performing the method of the present invention at a BS, channel reciprocity between the BS and a SS is established. As a result, allocation of sub-carriers to the SS for one or more of uplink transmission and downlink transmission may be done efficiently. Specifically, the SS may receive signals over a set of sub-carriers constituting a downlink channel, and owing to channel reciprocity, the SS may reuse one or more of the set of sub-carriers for uplink transmission. Consequently, no separate feedback information needs to be communicated between the BS and the SS for the purpose of allocating one or more sub-carriers to the SS for one or more of uplink transmission and downlink transmission. Further, determination of CSI may be performed at the BS for the purpose of allocating sub-carriers to the SS. Consequently, complexity of the SS is reduced. Another advantage conferred by embodiments of the present invention is the ability to efficiently schedule the SS between a downlink-BAMC zone and a downlink-beamforming zone. Further, embodiments of the present invention enable better adaptation to variations in channel conditions including, but not limited to, deep frequency selective fading and mobility of SS.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A method for maintaining channel reciprocity at a time-division duplex (TDD) Orthogonal Frequency Division Multiplexing (OFDM) transceiver, the method comprising:
receiving a first receive-signal using a first antenna and a second receive-signal using a second antenna, wherein the first receive-signal and the second receive-signal correspond to a first OFDM signal;
transforming the first receive-signal into a first frequency domain receive-signal representing amplitudes and phases of first sub-carriers;
transforming the second receive-signal into a second frequency domain receive-signal representing amplitudes and phases of second sub-carriers;
applying a cyclic delay to one of the first sub-carriers in the first frequency domain receive-signal to generate a cyclically delayed first frequency domain receive-signal; and
combining the second frequency domain receive-signal with the cyclically delayed first frequency domain receive-signal,
wherein the cyclic delay is applied to a signal sent from the first antenna.

2. The method of claim 1, wherein applying the cyclic delay comprises:
applying a phase ramp to the one of the first sub-carriers in the first frequency domain receive-signal,
wherein a slope of the phase ramp is proportional to the cyclic delay.

3. The method of claim 1, wherein the transceiver is a Base Station (BS) comprising the first antenna and the second antenna.

4. The method of claim 3, further comprising:
receiving sounding pilots over sub-carriers of the first OFDM signal, wherein the sounding pilots are transmitted by a subscriber station;
selecting at least one preferred sub-carrier among the sub-carriers of the first OFDM signal based on signal strength of the sounding pilots; and
using the at least one preferred sub-carrier to transmit a first transmit-signal to the subscriber station using the first antenna and a second transmit-signal using the second antenna,
wherein the first transmit-signal and the second transmit-signal correspond to a second OFDM signal,
wherein the first transmit-signal is generated by applying the cyclic delay to the second OFDM signal.

5. The method of claim 3, further comprising:
applying the cyclic delay to a transmit-signal to generate a cyclically delayed transmit-signal;
transmitting cyclically delayed transmit-signal using the first antenna to a subscriber station; and
transmitting the transmit-signal using the second antenna to the subscriber station.

6. The method of claim 5, wherein a portion of the first receive-signal and a portion of the second receive-signal are transmitted by the subscriber station using a set of antenna weights,
wherein the antenna weights are used by the subscriber station to combine the transmit-signal and the cyclically delayed transmit-signal received over the set of antennas.

7. The method of claim 5,
wherein the subscriber station receives the transmit-signal and the cyclically delayed transmit-signal over a set of antennas and performs receive beamforming of the transmit-signal and the cyclically delayed transmit-signal using a set of antenna weights corresponding to the set of antennas.

8. An apparatus for maintaining channel reciprocity at a time-division duplex (TDD) Orthogonal Frequency Division Multiplexing (OFDM) transceiver, the apparatus comprising:
a first frequency transform module configured to transform a first receive-signal into a first frequency domain receive-signal representing amplitudes and phases of first sub-carriers, wherein the first receive-signal is received by a first antenna of the TDD OFDM receiver and corresponds to a first OFDM signal;
a second frequency transform module configured to transform a second receive-signal into a second frequency domain receive-signal representing amplitudes and phases of second sub-carriers, wherein the second receive-signal is received by a second antenna of the TDD OFDM receiver and corresponds to the first OFDM signal;
a cyclic delay module configured to apply a cyclic delay to one of the first sub-carriers in the first frequency domain receive-signal to generate a cyclically delayed first frequency domain receive-signal; and
a combiner module configured to combine the at least one cyclically delayed first frequency domain receive-signal with the second frequency domain receive-signal,
wherein the cyclic delay is applied to a signal sent from the first antenna.

9. The apparatus of claim 8, wherein the cyclic delay module comprises:
a phase ramp module configured to apply a phase ramp to the one of the first sub-carriers in the first frequency domain receive-signal, wherein a slope of the phase ramp is proportional to the cyclic delay.

10. The apparatus of claim 8, wherein the transceiver is a Base Station (BS).

11. The apparatus of claim 10, further comprising:
a BS-selecting module configured to select at least one preferred sub-carrier among sub-carriers of the first OFDM signal based on signal strength of sounding pilots transmitted over the sub-carriers of the first OFDM signal by a subscriber station; and
a BS-transmitting module configured to transmit to the subscriber station a first transmit-signal over the at least one preferred sub-carrier using the first antenna and a second transmit-signal over the at least one preferred sub-carrier using the second antenna, wherein the first transmit-signal and the second transmit-signal correspond to a second OFDM signal, wherein the first transmit-signal is generated by applying the cyclic delay to the second OFDM signal.

12. The apparatus of claim 10, further comprising:

a BS-transmitting module configured to:

apply the cyclic delay to a transmit-signal to generate a cyclically delayed transmit-signal, transmit the cyclically delayed transmit-signal using the first antenna to a subscriber station, and transmit the transmit-signal using the second antenna to the subscriber station.

13. The apparatus of claim 12, wherein a portion of the first receive-signal and a portion of the second receive-signal are transmitted by the subscriber station using a set of antenna weights, wherein the antenna weights are used by the subscriber station to combine the transmit-signal and the cyclically delayed transmit-signal received over the set of antennas.

* * * * *

UNITED STATES PATENT AND TRADEMARK OFFICE
CERTIFICATE OF CORRECTION

| | |
|---|---|
| PATENT NO. | : 8,160,188 B2 |
| APPLICATION NO. | : 12/317162 |
| DATED | : April 17, 2012 |
| INVENTOR(S) | : Sriram Mudulodu |

It is certified that error appears in the above-identified patent and that said Letters Patent is hereby corrected as shown below:

In Column 18, line 1, please change "transmitting cyclically" to --transmitting the cyclically--.

Signed and Sealed this
Twelfth Day of June, 2012

David J. Kappos
*Director of the United States Patent and Trademark Office*